US008801518B2

(12) United States Patent
Lipscomb et al.

(10) Patent No.: US 8,801,518 B2
(45) Date of Patent: Aug. 12, 2014

(54) TOURNAMENT-STYLE PARIMUTUEL WAGERING SYSTEM

(76) Inventors: Steven Lipscomb, Los Angeles, CA (US); Laurence Kalinsky, Los Angeles, CA (US); Jon Kaplowitz, Los Angeles, CA (US); Adam Strohl, Los Angeles, CA (US); Mandy Glogow, Sherman Oaks, CA (US); Bill Olson, Los Angeles, CA (US); Drew Couto, San Diego, CA (US); William Koch, Los Angeles, CA (US); Gary Fenton, Los Angeles, CA (US)

( * ) Notice: Subject to any disclaimer, the term of this patent is extended or adjusted under 35 U.S.C. 154(b) by 1377 days.

(21) Appl. No.: 12/038,681

(22) Filed: Feb. 27, 2008

(65) Prior Publication Data

US 2009/0215527 A1 Aug. 27, 2009

(51) Int. Cl.
*A63F 13/46* (2014.01)
*G07F 17/32* (2006.01)

(52) U.S. Cl.
CPC ........ *G07F 17/3276* (2013.01); *G07F 17/3288* (2013.01); *G07F 17/3244* (2013.01)
USPC ................................................ 463/25; 463/6

(58) Field of Classification Search
USPC ..................................................... 463/25–28
See application file for complete search history.

(56) References Cited

U.S. PATENT DOCUMENTS

| | | | | |
|---|---|---|---|---|
| 5,018,736 | A | 5/1991 | Pearson et al. | |
| 5,046,736 | A | 9/1991 | Bridgeman et al. | |
| 5,263,723 | A | 11/1993 | Pearson et al. | |
| 5,575,474 | A | 11/1996 | Rossides | |
| 5,603,502 | A * | 2/1997 | Nakagawa | 273/292 |
| 5,779,242 | A * | 7/1998 | Kaufmann | 273/459 |
| 5,830,069 | A | 11/1998 | Soltesz et al. | |
| 5,842,921 | A | 12/1998 | Mindes et al. | |
| 5,971,854 | A | 10/1999 | Pearson et al. | |
| 6,371,855 | B1 * | 4/2002 | Gavriloff | 463/42 |
| 6,669,565 | B2 * | 12/2003 | Liegey | 463/42 |
| 7,094,151 | B2 | 8/2006 | Downes | |

(Continued)

FOREIGN PATENT DOCUMENTS

| | | | |
|---|---|---|---|
| WO | WO 00/79467 | A2 | 12/2000 |
| WO | 2009108805 | A2 | 9/2009 |

OTHER PUBLICATIONS

Korean Intellectual Property Office, "International Search Report and Written Opinion" for PCT/US2009/035337, mailed Oct. 12, 2009, 11 pages.

(Continued)

*Primary Examiner* — Bach Hoang
(74) *Attorney, Agent, or Firm* — Stolowitz Ford Cowger LLP

(57) ABSTRACT

Provided in embodiments of the present invention is a method of wagering on a plurality of events. In one embodiment, the method includes accepting a plurality of participants to wager on the events and providing each participant with a fantasy bankroll of money to wager on the events. After the participants have been provided with their respective fantasy bankrolls, wagers from the participants on a first event are received. After the event has been completed, a finishing order of the participants is determined. Next, a portion of the participants is cut based on the finishing order to form a group of finalists. The finalist wager on a second event and a finishing order of the finalists is determined from the outcome of the second event. Prizes are then awarded based on the finishing order of the finalists.

5 Claims, 4 Drawing Sheets

(56) References Cited

U.S. PATENT DOCUMENTS

| | | | | |
|---|---|---|---|---|
| 7,172,508 | B2 | 2/2007 | Simon et al. | |
| 7,206,762 | B2 | 4/2007 | Sireau | |
| 7,841,933 | B2 * | 11/2010 | Maul | 463/16 |
| 2002/0034981 | A1 * | 3/2002 | Hisada | 463/42 |
| 2003/0157976 | A1 | 8/2003 | Simon et al. | |
| 2003/0186744 | A1 | 10/2003 | Bradell | |
| 2004/0111358 | A1 * | 6/2004 | Lange et al. | 705/37 |
| 2004/0259631 | A1 | 12/2004 | Katz et al. | |
| 2005/0043094 | A1 * | 2/2005 | Nguyen et al. | 463/42 |
| 2005/0096124 | A1 | 5/2005 | Stronach | |
| 2005/0173862 | A1 * | 8/2005 | Orenstein | 273/292 |
| 2005/0208996 | A1 | 9/2005 | Friedman | |
| 2005/0227757 | A1 | 10/2005 | Simon | |
| 2005/0261043 | A1 | 11/2005 | Slade | |
| 2005/0288081 | A1 * | 12/2005 | Amaitis et al. | 463/6 |
| 2006/0025208 | A1 | 2/2006 | Ramsey | |
| 2006/0074504 | A1 * | 4/2006 | Maul | 700/91 |
| 2006/0183547 | A1 | 8/2006 | McMonigle | |
| 2006/0205483 | A1 | 9/2006 | Meyer et al. | |
| 2006/0246990 | A1 | 11/2006 | Downes | |
| 2006/0258438 | A1 | 11/2006 | Platis | |
| 2006/0281555 | A1 * | 12/2006 | Kellerman et al. | 463/42 |
| 2006/0287051 | A1 | 12/2006 | Katz et al. | |
| 2006/0287094 | A1 | 12/2006 | Mahaffey et al. | |
| 2007/0060380 | A1 | 3/2007 | McMonigle et al. | |
| 2008/0045334 | A1 | 2/2008 | Shvili | |
| 2008/0058094 | A1 * | 3/2008 | Amaitis et al. | 463/25 |
| 2009/0011827 | A1 * | 1/2009 | Englman et al. | 463/27 |
| 2009/0131175 | A1 * | 5/2009 | Kelly et al. | 463/42 |
| 2010/0113162 | A1 * | 5/2010 | Vemuri et al. | 463/42 |

OTHER PUBLICATIONS

International Bureau of WIPO, “International Preliminary Report on Patentability” for PCT/US2009/035337, mailed Sep. 10, 2010, 5 pages.

* cited by examiner

TOURNAMENT-STYLE PARIMUTUEL WAGERING SYSTEM

FIELD OF THE INVENTION

The present invention relates generally to wagering, and more particularly to a method of wagering and a system to implement the wagering method.

BACKGROUND

Wagering generally relates to the placement of monetarily based bets on a game of chance. However, wagering can be structured in a variety of manners. One of the more well-known versions of wagering is betting against "the house" (i.e., the organization facilitating or conducting the game). This type of wagering is very typical in casino environments where a player is placing a bet against the casino on a slot machine or at a table game, such as Blackjack. An equally common form of wagering involves betting among a group of people where all entry money is awarded in prizes. This style of wagering accounts for friendly games of poker, small sport betting pools (e.g., office pools), and even simple outcome based wagers between two or more people. Another type of wagering that combines elements of each of these betting styles is parimutuel (or pari-mutuel) wagering.

In parimutuel wagering, a plurality of individuals are grouped together and each place wagers on the outcome of an event. Typically, each of the individuals pays an entry fee to join the group. These entry fees are combined and a percentage of the total is taken out by a "house" for management and/or administration of the wagering activity (i.e., "house take"). The remainder of the entry fees is designated as an award pool that is split up among the members of the group who most correctly predict the outcome of the event. Thus, the individuals of the group are playing against each other instead of a "house," although a management entity is present to organize the parimutuel group and provide administration of the wagering activities. This type of wagering is often associated with race-based events where there are a plurality of contestants and a ranked finishing order. Unlike typical casino betting where the odds and payout amounts (paytable) are typically known before a bet is placed, the final odds in parimutuel wagering events usually are not calculated until the group of individuals (or pool) is closed (that is, not accepting any additional participants). However, even though the final odds are not know until the pool closes, the administration agencies often times provide approximate odds and/or payouts should no more bets be made at the time.

The skill of determining the outcomes of the events is often referred to as handicapping. This term came about in part because some bettors invested time and resources in researching information about the race participants (such as past race results, conditioning, recent injuries/problems etc.) that made the wager "handicapped" or informed. Skilled handicappers can turn this information into more educated selections or wagers. Thus, unlike casino betting where the house typically has the odds in their favor, parimutuel wagering can allow skilled individuals to make informed selections that put the odds slightly in their favor.

Conventional parimutuel wagering systems, however, may be intimidating for newer participants who do not want to risk large amounts of money on a singe race against more experienced handicappers. Additionally, skilled handicappers may feel that single smaller event parimutuel bets do not provide enough of a payout to conduct extensive research on the racers in the event.

SUMMARY

Embodiments of present concept provide a method of wagering on a plurality of events. In one embodiment, the method includes accepting a plurality of participants to wager on the events and providing each participant with a fantasy bankroll of money to wager on the events. After the participants have been provided with their respective fantasy bankrolls, wagers from the participants on a first event are received. After the event has been completed, a finishing order of the participants is determined. Next, a portion of the participants is cut based on the finishing order to form a group of finalists. The finalist wager on a second event and a finishing order of the finalists is determined from the outcome of the second event. Prizes are then awarded based on the finishing order of the finalists.

DETAILED DESCRIPTION

Figure 1A:
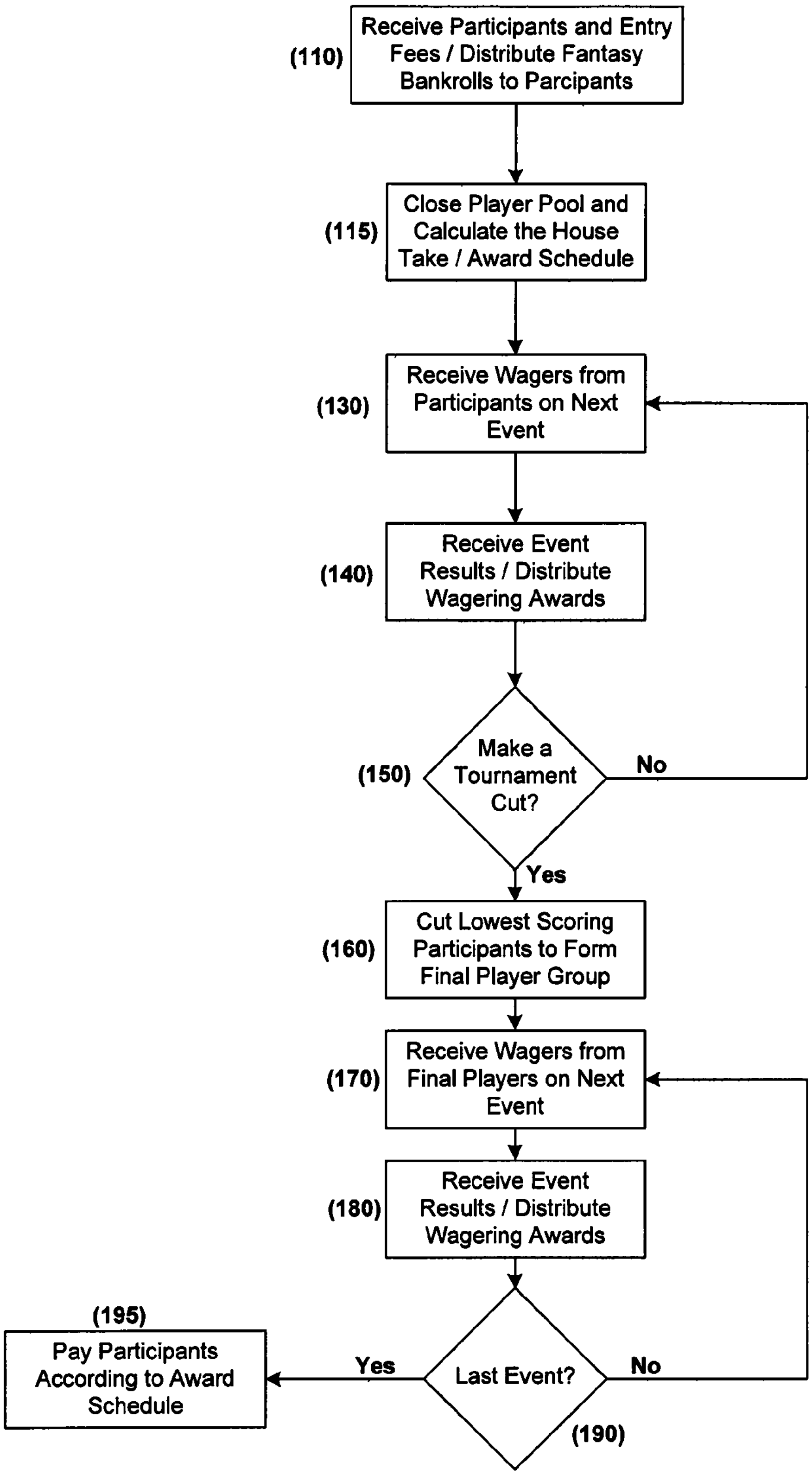
FIG. 1A is a flow diagram of a wagering system according to embodiments of the invention.

FIG. 1A is a flow diagram of a wagering system according to embodiments of the invention.

Referring to FIG. 1A, a tournament style parimutuel wagering system is set up surrounding a plurality of events. These events are typically races that have a ranked finishing order. Races may include horse races, greyhound races, jai alai, human track races, or any other sporting event where the racers finish in a ranked order. In some embodiments, the plurality of events may only include two events. However, it is generally preferred to include at least three events to allow the participants to use their handicapping skills over a larger scope of events with more variations present.

Once a set of events is selected for a tournament and the tournament is opened up to participants, participants are received and distributed a fantasy bankroll to use during the tournament (110). In some embodiments, each of the participants is allowed to enter upon payment of an entry fee. This entry fee may be used to fund the award pool after a house take is removed as discussed below. In other embodiments, an entry fee may not be required. The fantasy bank roll may also not correspond to the amount of the entry fee. That is, the fantasy bankroll may preferably be a higher number than the entry fee so that larger amounts of fantasy money may be wagered instead of fractions of a dollar. For example, each participant may be given a fantasy bankroll of $100.00 for a $10.00 entry fee. In this example, some wagers would be $5.00 wagers (of fantasy money) rather than $0.50 wagers (of real money), which may reduce the amount of rounding for payouts. Additionally, each participant is usually given the same fantasy bankroll at the tournament start to even the playing field. This way, each player will have the same starting fantasy bankroll and the competition will focus solely on the handicapping skills of the players without introducing any variables related to starting bankroll amounts. Nevertheless, in some embodiments, different fantasy bankrolls may be given depending on the size of the entry fee paid, the player's status in the tournament, or based off a separate wagering event.

The tournament entry field is then closed and a house take and award schedule may be calculated (115). The tournament may be limited to a particular number of participants or players (e.g., 1000 participants) or the tournament entry field may be closed at particular time prior to the start of the first event. The house take or commission is the amount of money paid to the organizations and associations involved in setting up or regulating the tournament. The house take may be calculated prior to the closing of the tournament entry field or calculated after the tournament entry field has been closed. If the house take is based at least in part from the entry fees paid by the participants, it is not usually calculated until the tournament entry field is closed (i.e., not accepting any additional participants).

The award schedule is the paytable for each of the finishers in the tournament. In other words, the award schedule sets out what percentage of the prize money each finisher receives. Typically, the first few finishers receive substantial prize awards and the bottom majority of participants are not awarded anything. The award schedule may also be calculated prior to the closing of the tournament entry field or may be calculated after the tournament entry field has been closed. If the award schedule is based at least in part from the entry fees paid by the participants, it is also not usually calculated until the tournament entry field is closed. This way if there are fewer participants than anticipated, the award schedule can be appropriately modified. Even if the award schedule is not completely calculated until the entry field is closed, a host association will typically provide an estimated award schedule so that participants have a rough idea of what the payouts will be. The use of entry fees in calculating the house take and award pool are described below in further detail with reference to FIG. 2A.

After the tournament entry field has been closed, the participants are allowed to wager on an event (130). The host organization may determine what kind of wagers is allowed in the tournament. For the sake of simplicity and emphasis on handicapping skill over luck, the host organization may limit the wagering to straight bets; that is, wagers on win, place, show, or a combination of win, place, and show. However, some tournaments may be configured to allow for exotic bets, such as box, key, or wheel bets. In embodiments where there are only two events, participants may be required to make at least one wager on the first event so that a finishing order of participants can be formed. However, as discussed above, the tournament preferably has at least three events. When the tournament consists of three or more events, the participants may be allowed to "pass" (i.e., not place any wager) on one or more of the events. This may be done, so that participants can skip an event where they determine there is no clear favorites to win the event, or where they are not familiar with the racers in the event. Additionally, the live odds of the event may be displayed for the participants so that betting trends or other information may be used in determining wagers.

After the wagers have been received for the event and the event has been completed, the results of the event are shown and any awards based on the wagering of the participants is distributed (140). The live odds of the event may be used to determine the fantasy money awarded for each of the wagers made on the event. In some embodiments, the winning payoffs may be capped at 25/1 to comply with state gaming regulations. Additionally, any fraction of a fantasy dollar awarded may be rounded up to the nearest dollar. If a 25/1 cap is being used, however, the fractional fantasy dollar may be rounded down to avoid exceeding the regulated cap. Any fantasy money awarded is added to the respective player's fantasy bankroll and may be used to wager on subsequent events.

In this tournament-style parimutuel wagering system, a tournament-style cut is made during the plurality of events to narrow the field of participants to a group of finalists that compete for the top prizes in the award schedule. For embodiments with only two events, the tournament-style cut is made after the first event so that the second event may be used as a final event for the finalists. For embodiments with three or more events, the tournament-style cut may be made anytime after a first event and prior to a final event. It may be preferable to make the cut closer to the final event so that each of the participants has several events to wager on before the group of finalists is determined. For example, in a seven race event, it may be preferable to make the cut after the sixth event. This way, each of the participants would have six events to wager on prior to the cut. Generally, the more events held prior to the cut favors the participants with the greater handicapping skills. In other embodiments, however, multiple events may be held after a cut is made. These embodiments may be especially preferable if the tournament incorporates a large number of events or has events held over several days.

In the system illustrated in FIG. 1A, after an event has been completed and any payoffs have been awarded, it is determined whether or not the tournament-style cut is to be made (150). If the cut is not to be made, such as where there are additional preliminary events to be held before the cut is made, all of the participants are again allowed to wager on the next event being held (130). If the tournament-style cut is to be made, a finishing order of the participants is examined and a lower scoring portion of the participants are cut such that they are not allowed to wager on the one or more final events (160). The finishing order may be determined by the current fantasy bankroll amount of each participant in some embodiments. In other embodiments, however, additional scoring criteria may be used to determine the finishing order. Additional factors may include total amount wagered during the previous events, number of events wagered on, percentage of amounts won versus wagered, etc. These additional factors may be used to encourage participants to wager and participate more in the events. The remaining portion of the participants (i.e., those not cut) makes up a final participant or player group. This final group of participants may also be referred to as finalists. In some embodiments, the fantasy bankrolls of each of the finalists may be reset to equal amounts so that wagers made in the earlier rounds do not influence the final event. In other embodiments, however, the fantasy bankroll of the finalists may be carried forward from the earlier rounds to the final rounds.

The finalists are then permitted to place wagers on a next event (170). The format for the wagering may be similar to the format used for the earlier events, or the format may be altered for the finalists. For example, only straight bets may be allowed in the earlier events while exotic bets may be allowed in the at least one final event. After the wagers are received and the event has occurred, the results of the event are displayed and any payoff awards based on the wagering are respectively distributed to the finalists (180). Again, live odds from the event may be used in calculating the amounts of payoff awards and payoff caps (e.g., the 25/1 cap) may still be enforced.

It is then determined whether the event wagered on by the finalists was the last or final event (190). If it was not the final event, the finalists are again allowed to wager on a subsequent event (170). If it was the final event of the tournament, a finishing order of the finalists is determined and prizes are awarded according to the award schedule (195). The finishing order may again depend only on the remaining fantasy bankrolls of the finalists or may include other factors such as the ones discussed above in the determination of the finishing order of the participants.

The award schedule may be structured such that only the finalists are provided with a monetary payout. In these embodiments, the awards may be paid out after the finalists' finishing order is determined. In other embodiments where some of the higher ranked participants not making the cut are awarded something from the award schedule, the awards may be paid out after the finalists' finishing order is determined or part of it may be paid out to the participants not making the cut prior to the determination of the finalists' finishing order.

While the embodiment illustrated in FIG. 1A includes only one tournament-style cut, other embodiments may include multiple tournament-style cuts. Multi-cut tournaments may be preferred when there are a very large number of participants.

Figure 1B:
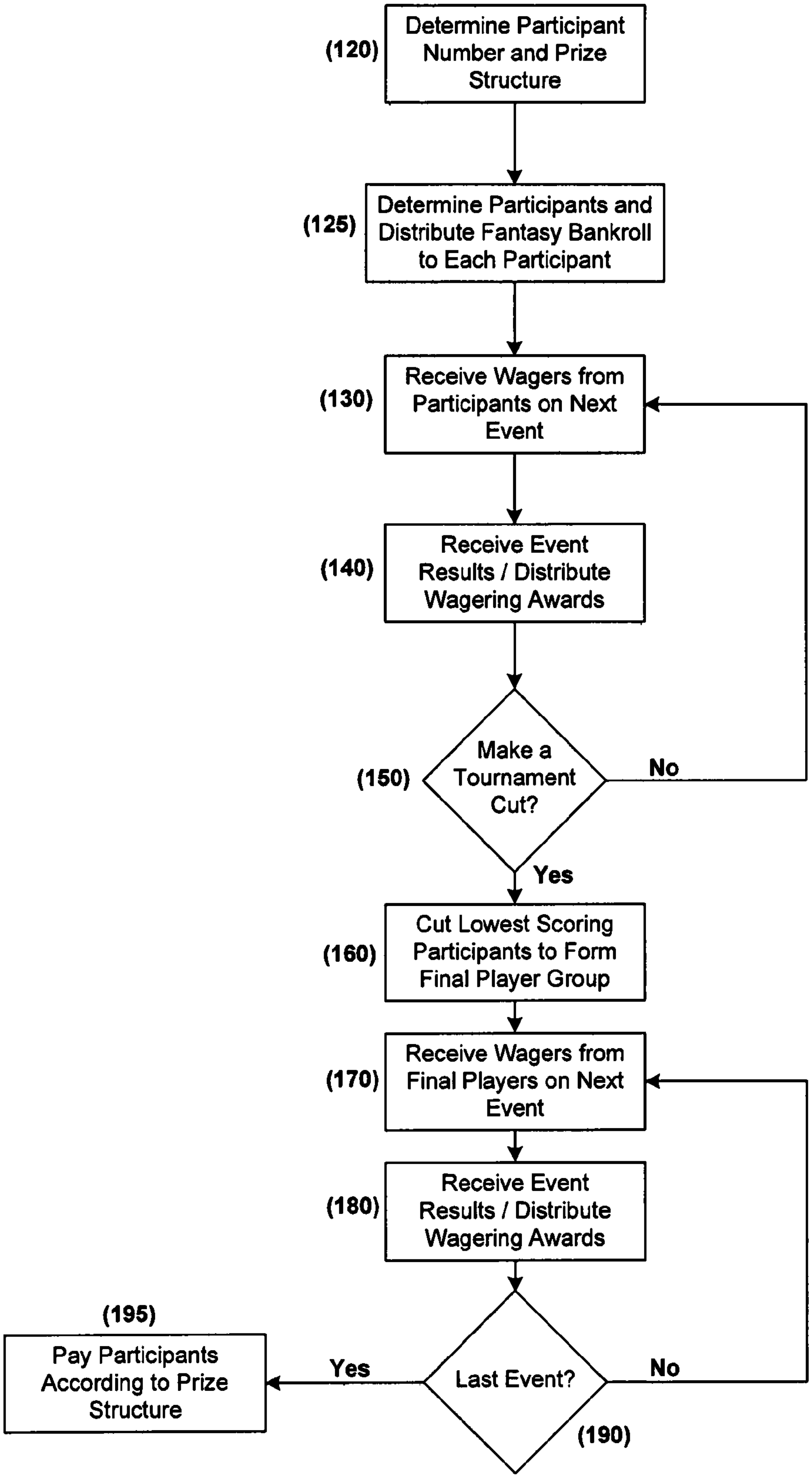
FIG. 1B is a flow diagram of a wagering system according to embodiments of the invention.

FIG. 1B is a flow diagram of a wagering system according to embodiments of the invention. The embodiments illustrated in FIG. 1B includes several steps that are similar to steps in the embodiments illustrated in FIG. 1A. These similar steps will not be described again for brevity. Unlike the embodiments illustrated in FIG. 1A, the embodiments illustrated in FIG. 1B include the steps of determining the participant number and prize structure (120) prior to closing the entry field, and determining the participants (125) rather than receiving participants. That is, a host association may choose a tournament format where the number and identity of the participants is predetermined. Additionally, the prize structure may also be determined by the host organization. The tournament is still based on a parimutuel wagering system since the number of participants allowed will be a factor in determining an award pool that is shared among the top finishers of the participants.

The embodiment illustrated in FIG. 1B may be a better fit for tournaments that are broadcast or have supporting sponsors. In these situations, revenue generated from the broadcast or money paid by the sponsors may be at least partially used in funding the award pool. If the tournament is broadcast, the host organization or television station may determine the number and/or identity of participants to be included in the tournament. This may include simply receiving entries prior to the tournament and determining whether or not to allow them to participate (as opposed to allowing people paying the entry fee to participate), or may include fielding a specific group of participants, such as celebrities or prior tournament winners.

If the tournament is broadcast, live odds, results, and virtual odds of making the cut may be displayed for viewers during the tournament as the participants place wagers and events are run. For example, if one of the events is a horse race, instantaneous wagering results may be displayed for each wagering participant based on the current order of the horses during the race. That is, if a horse picked to win by one player passes a horse picked to win by another player, live changes in the predicted payoffs associated with each player may be updated to reflect the changing of the horse order. This may build excitement for the viewers as they can see the predicted wagering results change as the race unfolds.

Figure 2A:
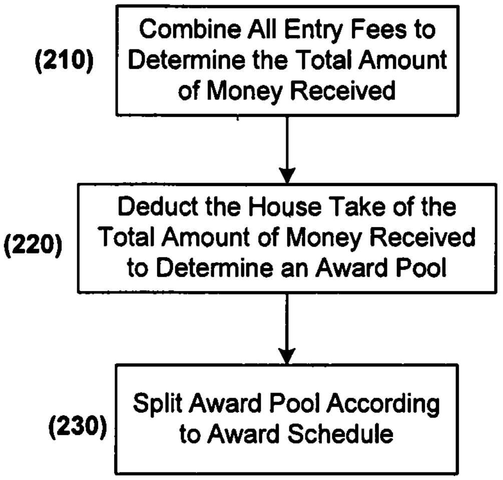
FIG. 2A is a flow diagram of a portion of the wagering system illustrated in FIG. 1A.

FIG. 2A is a flow diagram of a portion of the wagering system illustrated in FIG. 1A. Referring to FIG. 2A, in embodiments that use the entry fee of participants to fund the award pool and house take, the entry fees are first combined to determine the total amount of money received (210). After the total amount of money received has been determined, a house take of the total money is deducted and the remaining money is then used to fund the award pool (220). The award pool is then split according to the award schedule such that the prize amount for each finishing participant is known. An example of the calculations involved in these steps is shown below in example #1.

Figure 2B:
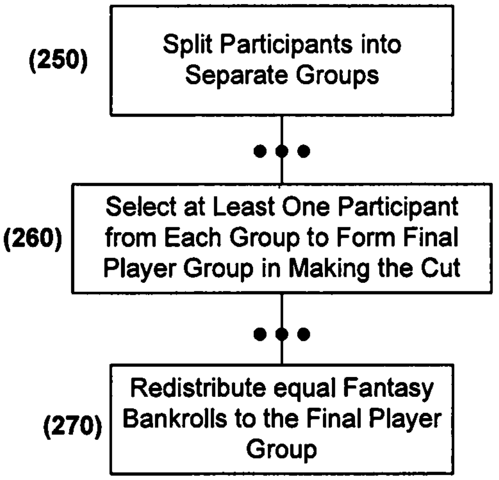
FIG. 2B is a flow diagram of additional steps of the wagering system according to embodiments of the invention.

FIG. 2B is a flow diagram of additional steps of the wagering system according to embodiments of the invention. Referring to FIG. 2B, instead of lumping all of the participants in a single group during the preliminary events prior to the cut, the participants may be split into separate groups of participants (250). These groups may be chosen at random or may be split up according to location, type of wagering device being used, relative skill level, or other criteria. The participants within each group than compete against the other participants in their group rather than competing against the entire field of participants.

When the tournament-style cut is made, at least one player from each group may be selected as a finalist (260). This may include choosing only one participant from each group as a finalist or may include taking additional finalists based on current fantasy bankroll or other criteria. In addition, the finalists may be given equal fantasy bankrolls after the cut has been made so that they compete against each other based on similar starting bankrolls (270). This step may be especially important in these embodiments because the wagering activity of each participant may be influenced by the performance of other members of their original group. For example, a participant that is very far ahead in his or her group may choose not to wager on a final event before the cut because of his or her relative position within the group where other participants in a different group may wager on the final event because of much tighter standings within that group.

Figure 3:
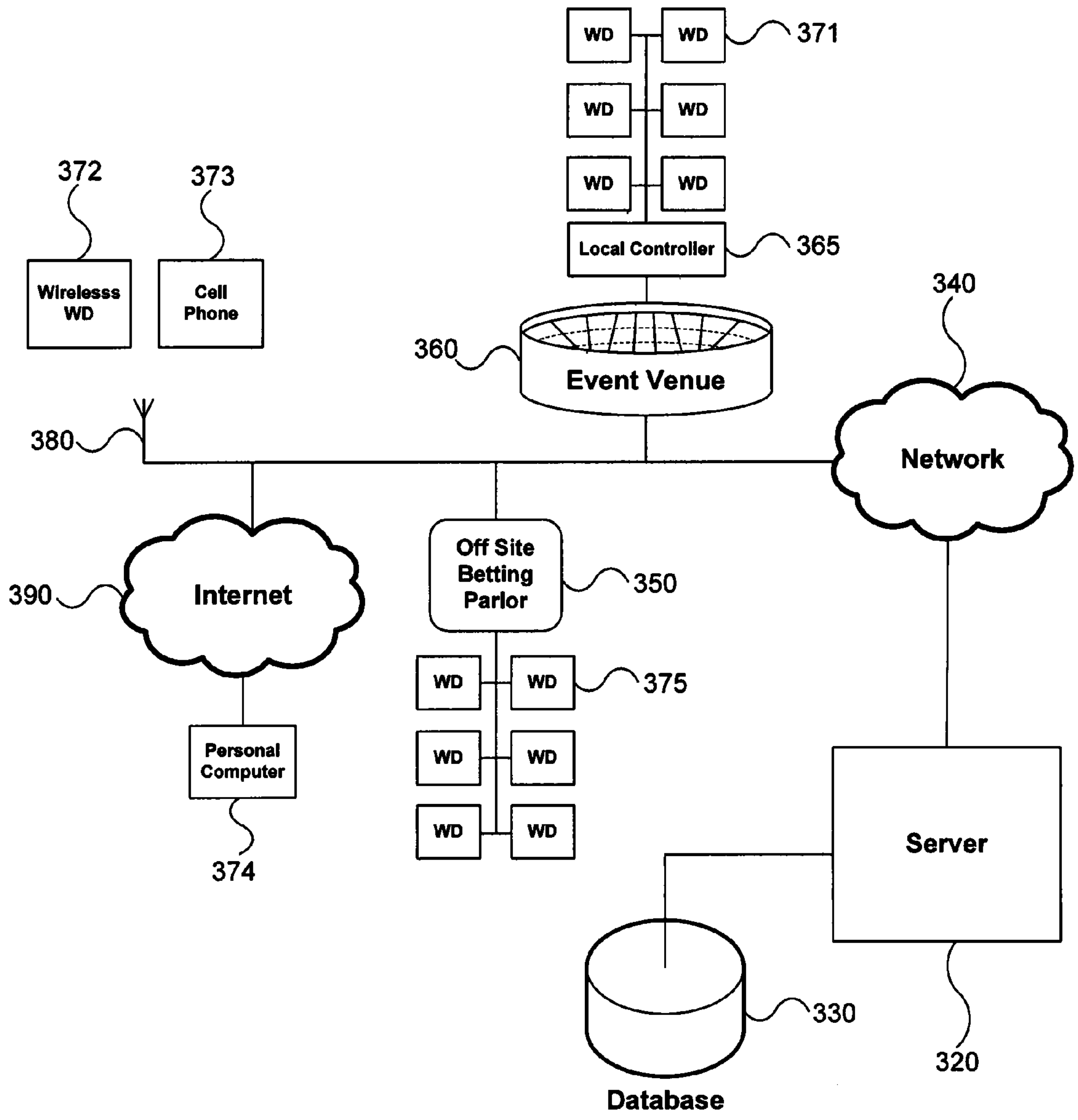
FIG. 3 is a functional block diagram of a wagering system according to embodiments of the invention.

FIG. 3 is a functional block diagram of a wagering system according to embodiments of the invention. Referring to FIG. 3, multiple wagering devices (WDs) 371, 372, 373, 374, and 375 may be coupled to one another and coupled to a remote server 320 through a network 340. For ease of understanding, wagering devices or WDs 371, 372, 373, 374, and 375 are generically referred to as WDs 371-375. The term WDs 371-375, however, may refer to any combination of one or more of WDs 371, 372, 373, 374, and 375. Additionally, the server 320 may be coupled to one or more databases 330. These network 340 connections may allow multiple wagering devices 371-375 to remain in communication with one another during particular tournament modes such full group play or separate group play.

The wagering devices (WDs) 371-375 may include various types of gaming devices, kiosks, wireless devices, cell phones, personal computers, and the like. Some of the WDs 371 may be located at an event venue 360, such as a race track. The WDs 371 located at the event venue 360 may be controlled by a local controller 365 that distributes signals from the sever 320 or other network devices. These WDs 371 may include kiosks, banks of microprocessor operated gaming devices, wireless wagering devices, or even human operated ticket windows at the event venue 360. Wireless WDs 372 and cell phones 373 may be coupled to the network 340 via an antenna 380. The wireless nature of these devices allows them to be utilized at an event venue 360 or at various other remote locations. Similarly, personal computers 374 may be connected to the network 340 over the internet 390 making them available at both the event venue 360 or at remote locations. WDs 375 used in tournament play may also be housed at off site betting parlors 350, such as casinos or off-track betting establishments. The server 320 and data base 330 may be located at an event venue 360 or may also be remotely located. Each wagering device 371-375 may include one wagering station for a single participant, or may include multiple wagering stations for a plurality of participants, such as a multi-player interactive gaming table. Multi-station wagering devices may be preferable at off track sites 350, such as casinos, or at an event venue 360 for space considerations.

In operation, the wagering devices 371-375 allow participants to join tournaments, establish fantasy bankrolls, and receive fantasy money wagers on the events. The WDs 371-375 may preferable have a screen to display wagering data and event results, as well as at least one input mechanism so that the participant can interact with the WD 371-375. This input mechanism may be a soft button on a touchscreen display, a keyboard or keypad, a tracking device with pointer, or the like. The WDs 371-375 may further include a device to accept an entry fee, such as a bill acceptor, credit card reader, or ticket validator.

Below are two examples of setting up a wagering system according to embodiments of the invention. Both examples provide a set of rules along with example tables of house splits and award schedules. These examples are provided to illustrate principles of the invention and are not intended to be definitive or limiting of the scope of the invention.

Example #1

In the first example, a wagering system is directed to a tournament style parimutuel wagering system on horse races. More specifically, this example relates to a multi-race parimutuel wagering event where the outcome of the tournament is determined by each participant's handicapping skills. The wagering system of this example is governed by the example rules set out below in Table #1. Additionally, exemplary tables of the splitting of the house take and the award schedule are provided.

TABLE #1

| Rule # | Rule Description |
|---|---|
| 1 | All participants must be 18 years of age or older. |
| 2 | The cost of the wager is set by the host racing association. |
| 3 | Each participant receives a starting fantasy bankroll. |
| 4 | The number of races that complete the wager varies depending on the specifics of the "tournament," as determined by the host racing association, but shall include no less than three races. |
| 5 | Each round of the "tournament" consists of a fantasy win, place, or show wagering opportunity, or any combination of the three, on one horse per fantasy wagering opportunity/race/event. Participants may also "pass" (not wager) on any or all of the races. |
| 6 | Official program numbers must be used for all wagers. All participants are responsible for ensuring each wager is placed correctly. |
| 7 | These are no minimum fantasy wagers per race, and the participant may risk up to their entire fantasy bankroll on any given race. |
| 8 | Live race payoffs are used to calculate each participant's fantasy winnings/point totals. |
| 9 | There is a 25/1 payoff cap laced on all fantasy wagers. |
| 10 | Each participant's fantasy wins or losses will be reflected in their cumulative fantasy bankroll at the end of each race. |
| 11 | Any payoff including a fractional dollar is rounded up to the nearest dollar, but shall not exceed the 25/1 cap. |
| 12 | A tournament style cut will be made after the second to last race. The cut is made so as to indentify the finalists. The number of finalists shall be no less than five, and may include more as determined by the host racing association. |
| 13 | Of the finalists, the participant finalist(s) with the highest fantasy bankroll after the last race is/are the winner(s) with the order of subsequent finalist finishers determined by the final fantasy bankroll for each of the finalists. |
| 14 | The net parimutuel pool is distributed to the top 5% of all participants in the tournament. |
| 15 | The net parimutuel pool shall be distributed in accord with the award schedule. |

The server 320 may be largely responsible for running the tournament. That is, the server may be configured to record the wagers made at each of the WDs 371-375, track the results of the plurality of events, award fantasy money based on the event results, and track the order of the participants relative to each other. In addition the server 320 may be responsible for implementing the tournament-style cut based on the finishing order of the participants. The server 320 may also record wagers made on a final event and determine the prizes that are to be awarded to the participants/finalists. In some embodiments, the server may also be used to track the live odds of the races and transmit data used in the broadcast of the tournament. In some embodiments, the server may also be used to calculate the total money pool, the house take, and the award pool based on the entry fees received. The server may also provide various other functions in implementing the tournament.

In addition to the above rules, the host racing association would deduct a house take or commission from the totaled entry fee pool paid by the participants. As discussed above, this house take is usually divided between several organizations involved in the racing event. In this example, the house take is 25% of the total entry fees collected and is distributed according to Table 2 below.

TABLE #2

| Distribution Recipient | % Received |
|---|---|
| Racing Association/Fair | 7.75% |
| Purses | 7.75% |
| Breeders | 0.75% |
| Satellite Wagering Facilities | 2.0% |

TABLE #2-continued

| Distribution Recipient | % Received |
|---|---|
| License Fee | 0.75% |
| Tournament Organization Fee | 1.0% |
| Tournament Organizer's License Fee | 5.0% |
| Total House Take | 25.0% |

After the house take of the totaled entry fees has been removed, the remaining entry fees make up the award pool or award pot. In this example, the award pool is divided among the participant winners after the final race of the multi-race tournament. The award pool is divided according to an award schedule. For this example, the award schedule is determined prior to receiving the entry fees. Hence, the participants know at least the percentage pay back for each finishing position in the tournament. Table #3 below sets out the award schedule for this example. Note that the "Win %" is the percentage of the award pool, rather than a percentage of the totaled entry fees. That is, the "Win %" is calculated after the house take has been removed. The "Total %" is the total percentage of the award pool paid to a particular group of finishers. In this example, the top five finishers (e.g., the finalists) are each paid with a specified percentage of the award pool. Hence, the "Total %" is the same as the "Win %" since there is only one finisher being paid at that percentage level. In contrast some of the non-finalist finishers are paid in groups. Here, the "Total %" is the "Win %" multiplied by the number of participants being paid at that percentage.

TABLE #3

| Finish | Win % | Total % |
|---|---|---|
| 1 | 45.00% | 45.00% |
| 2 | 20.00% | 20.00% |
| 3 | 8.00% | 8.00% |
| 4 | 3.00% | 3.00% |
| 5 | 2.75% | 2.75% |
| 6-10 | 2.00% | 10.00% |
| 11-15 | 1.00% | 5.00% |
| 16-20 | 0.50% | 2.50% |
| 21-25 | 0.25% | 1.25% |
| 26-50 | 0.10% | 2.50% |
| Total | | 100.00% |

For this example, the tournament is limited to 1000 participants. Each participant is required to pay an entry fee of $50.00. Hence, the total of the entry fees collected would be $50,000.00. After the house take of 25% ($12,500.00), the award pool or parimutuel payout would be $37,500.00. Using these numbers, the payout at each position is shown in Table #4 below. Note that the "Payout" is the money actual paid to each participant at their respective finishing position, and "Total Payout" is the total money paid for each group of participants at a specific percentage grouping.

TABLE #4

| Finish | Win % | Total % | Payout | Total Payout |
|---|---|---|---|---|
| 1 | 45.00% | 45.00% | $16,875.00 | $16,875.00 |
| 2 | 20.00% | 20.00% | $7500.00 | $7500.00 |
| 3 | 8.00% | 8.00% | $3000.00 | $3000.00 |
| 4 | 3.00% | 3.00% | $1125.00 | $1125.00 |
| 5 | 2.75% | 2.75% | $1031.25 | $1031.25 |
| 6-10 | 2.00% | 10.00% | $750.00 | $3750.00 |
| 11-15 | 1.00% | 5.00% | $375.00 | $1875.00 |
| 16-20 | 0.50% | 2.50% | $187.50 | $937.50 |
| 21-25 | 0.25% | 1.25% | $93.75 | $468.75 |
| 26-50 | 0.10% | 2.50% | $37.5 | $937.50 |
| Total | | 100.00% | | $37500.00 |

Example #2

In the second example, a wagering system is directed to a tournament style parimutuel wagering system on horse races that is set up by a tournament organizer to be broadcast on television. In this example, instead of accepting entry fees from a large group of prospective participants, the tournament organizers may cover the entry fee of the participants or supplement the award schedule with additional prizes paid for by sponsors of the tournament event. Additionally, the tournament organizers may select certain participants to enter the contest, such as celebrities or prior tournament winners. Similar to the first example, however, the outcome of the tournament is determined by each participant's handicapping skills. The wagering system of this example is governed by the example rules set out below in Table #5. Additionally, exemplary tables of the house take split and the award schedule are provided.

TABLE #5

| Rule # | Rule Description |
|---|---|
| 1 | All participants must be 18 years of age or older. |
| 2 | The participants are selected by the tournament organizer. |
| 3 | Each participant receives a starting fantasy bankroll. |
| 4 | The number of races that complete the wager varies depending on the specifics of the "tournament," as determined by the tournament organizer, but shall include no less than three races. |
| 5 | Each round of the "tournament" consists of a fantasy win, place, or show wagering opportunity, or any combination of the three, on one horse per fantasy wagering opportunity/race/event. Participants may also "pass" (not wager) on any or all of the races. |
| 6 | Official program numbers must be used for all wagers. All participants are responsible for ensuring each wager is placed correctly. |
| 7 | These are no minimum fantasy wagers per race, and the participant may risk up to their entire fantasy bankroll on any given race. |
| 8 | Live race payoffs are used to calculate each participant's fantasy winnings/point totals. |

TABLE #5-continued

| Rule # | Rule Description |
|---|---|
| 9 | There is a 25/1 payoff cap laced on all fantasy wagers. |
| 10 | Each participant's fantasy wins or losses will be reflected in their cumulative fantasy bankroll at the end of each race. |
| 11 | Any payoff including a fractional dollar is rounded up to the nearest dollar, but shall not exceed the 25/1 cap. |
| 12 | The participants will be split into a predetermined number of groups by the tournament organizers. |
| 13 | A tournament style cut will be made after a predetermined number of races where at least one participant of each group with the highest bankroll will be advanced to a final round. The cut is made so as to indentify the finalists for the final round. The number of finalists shall be no less than five, and may include more as determined by the tournament organizers. |
| 14 | Of the finalists, the participant finalist(s) with the highest fantasy bankroll after the last race is/are the winner(s) with the order of subsequent finalist finishers determined by the final fantasy bankroll for each of the finalists. |
| 15 | An award schedule provided by the tournament organizers will be used to determine prizes awarded from the award pool. |

Unlike example #1, where the a percentage of the entry fees from the participants was used to pay off the various associations and organizations involved in making the tournament happen, this example relies at least in part on the revenues generated from broadcasting the wagering tournament on television. This house take or commission can be a set of predetermined fees or may be structured as a percentage of the revenues generated from the broadcast. Additionally, in some embodiments, the house take or commission may be a combination of an entry fee and a smaller percentage of the generated revenue. In example #2, the house take is percentage of the revenue generated by the broadcast of the tournament. Table #6 sets out the distribution of the house take among the various organizations. Here, the house take is 5% of the total generated revenue.

TABLE #6

| Distribution Recipient | % Received |
|---|---|
| Racing Association/Fair | 1.50% |
| Purses | 1.50% |
| Breeders | 0.10% |
| Satellite Wagering Facilities | 0.50% |
| License Fee | 0.10% |
| Tournament Organization Fee | 0.30% |
| Tournament Organizer's License Fee | 1.00% |
| Total House Take | 5.00% |

As with the house take, the award pool is not derived entirely from the entry fees of the participants. Rather, at least some of the revenue generated from the broadcast of the tournament is used to find the award pool. In addition, the award pool is usually set prior to the beginning of the tournament. That is, instead of using a percentage of the generated revenue (as with the house take calculations), the award schedule is based off a predetermined pot of money. In this example, a $500,000 total award pool is given to the top finishers in the tournament. An award schedule is still used to determine what percent of this total award pool is paid to each finisher. Table 7 sets out this award schedule. For this example, the award schedule is determined prior to having the participants join the tournament. Hence, the participants know the payback amounts for each finishing position prior to accepting an invitation to play it the tournament. Note again that the "Win %" is the percentage of the award pool, rather than a percentage of the totaled entry fees. That is, the "Win %" is calculated after the house take has been removed. The "Total %" is the total percentage of the award pool paid to a particular group of finishers. In this example, the top five finishers (e.g., the finalists) are each paid with a specified percentage of the award pool. Hence, the "Total %" is the same as the "Win %" since there is only one finisher being paid at that percentage level. In contrast some of the non-finalist finishers are paid in groups. Here, the "Total %" is the "Win %" multiplied by the number of participants being paid at that percentage.

TABLE #7

| Finish | Win % | Total % |
|---|---|---|
| 1 | 45.00% | 45.00% |
| 2 | 20.00% | 20.00% |
| 3 | 8.00% | 8.00% |
| 4 | 3.00% | 3.00% |
| 5 | 2.75% | 2.75% |
| 6-10 | 2.00% | 10.00% |
| 11-15 | 1.00% | 5.00% |
| 16-20 | 0.50% | 2.50% |
| 21-25 | 0.25% | 1.25% |
| 26-50 | 0.10% | 2.50% |
| Total | | 100.00% |

As mentioned above, for this example, the total award pool for this tournament is $500,000. Using these numbers, the payout at each position is shown in Table #8 below. Note that the "Payout" is the money actual paid to each participant at their respective finishing position, and "Total Payout" is the total money paid for each group of participants at a specific percentage grouping.

TABLE #8

| Finish | Win % | Total % | Payout | Total Payout |
|---|---|---|---|---|
| 1 | 45.00% | 45.00% | $225,000.00 | $225,000.00 |
| 2 | 20.00% | 20.00% | $100,000.00 | $100,000.00 |
| 3 | 8.00% | 8.00% | $40,000.00 | $40,000.00 |
| 4 | 3.00% | 3.00% | $15,000.00 | $15,000.00 |
| 5 | 2.75% | 2.75% | $13,750.00 | $13,750.00 |
| 6-10 | 2.00% | 10.00% | $10,00.00 | $50,000.00 |
| 11-15 | 1.00% | 5.00% | $5000.00 | $25,000.00 |
| 16-20 | 0.50% | 2.50% | $2500.00 | $12,500.00 |
| 21-25 | 0.25% | 1.25% | $1250.00 | $6250.00 |
| 26-50 | 0.10% | 2.50% | $500.00 | $12,500.00 |
| Total | | 100.00% | | $500,000.00 |

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A system for wagering on horse races in a tournament setup, the system comprising:

a plurality of wagering stations connected to one another via a network, each wagering station configured to receive wagers of fantasy money from participants on a plurality of horse racing events; and a server connected to the network, the server configured to perform steps including:

recording a first set of wagers made on a first horse race event at the plurality of wagering stations, tracking a first finishing order of horses in the first horse race event, determining payouts to the participants based on the participants' corresponding wagers and the first finishing order of the horses, awarding an amount of fantasy money to the participants at the plurality of wagering stations based on the determined payouts for the first horse race event, scoring the participants based upon scoring criteria to determine a corresponding score for each of the participants wherein the scoring criteria comprises at least one of a total amount wagered during one or more previous events, a number of events wagered on, or a percentage of amounts won versus amounts wagered, determining a first finishing order of the participants based on each of the participants' ending amounts of fantasy money and the corresponding score for each of the participants, cutting a portion of the participants based on the first finishing order to form a group of finalists, recording a second set of wagers from the group of finalists on a second horse race event, and determining prizes to be awarded to at least some of the group of finalists based on a second finishing order of the group of finalists.

2. The system of claim 1, wherein the plurality of wagering stations are further configured to receive an entry fee from a participant.

3. The system of claim 2, wherein the server is further configured to calculate a total money pool, a house take, and an award pool based on entry fees received from the plurality of wagering stations.

4. The system of claim 3, wherein the server is further configured to notify a set of wagering stations corresponding to the at least some of the group of finalists determined to be awarded prizes.

5. A system for wagering on horse races in a tournament setup, the system comprising:

a plurality of wagering stations connected to one another via a network, each wagering station configured to receive wagers of fantasy money from participants on a plurality of horse racing events;

at least one memory to store amounts of fantasy money associated with each of the participants at the plurality of wagering stations; and a server connected to the network, the server configured to perform steps including:

recording a first set of wagers made on a first horse race event at the plurality of wagering stations, identifying first non-playing participants that have passed on the first horse race event, tracking a first finishing order of first horses in the first horse race event, determining first payouts to the participants based on the participants' corresponding wagers in the first set of wagers and the first finishing order of the first horses, awarding a first amount of fantasy money to the participants at the plurality of wagering stations based on the determined first payouts for the first horse race event, recording a second set of wagers made on a second horse race event at the plurality of wagering stations, identifying second non-playing participants that have passed on the second horse race event, requiring any of the first non-playing participants that passed on the first horse race event to wager on the second horse race event, tracking a second finishing order of second horses in the second horse race event, determining second payouts to the participants based on the participants' corresponding wagers in the second set of wagers and the second finishing order of the second horses, awarding a second amount of fantasy money to the participants at the plurality of wagering stations based on the determined second payouts for the second horse race event, scoring the participants based upon scoring criteria to determine a corresponding score for each of the participants, wherein the scoring criteria comprises at least one of a total amount wagered during one or more previous events, a number of events wagered on, or a percentage of amounts won versus amounts wagered;

determining a first finishing order of the participants based on ending amounts of fantasy money and the corresponding score for each of the participants, cutting a portion of the participants based on the first finishing order to form a group of finalists, recording a third set of wagers from the group of finalists on a third horse race event, and determining prizes to be awarded to at least some of the group of finalists based on a second finishing order of the group of finalists.

* * * * *